United States Patent
Reinders et al.

(10) Patent No.: US 10,346,512 B2
(45) Date of Patent: Jul. 9, 2019

(54) PERSONALIZED MEMORY COMPILATION FOR MEMBERS OF A GROUP AND COLLABORATIVE METHOD TO BUILD A MEMORY COMPILATION

(71) Applicant: Applaud, LLC, Cincinnati, OH (US)

(72) Inventors: Robert R. Reinders, Loveland, OH (US); Christopher Romano, Maineville, OH (US)

(73) Assignee: Applaud, LLC, Cincinnati, OH (US)

( * ) Notice: Subject to any disclaimer, the term of this patent is extended or adjusted under 35 U.S.C. 154(b) by 227 days.

(21) Appl. No.: 15/019,282

(22) Filed: Feb. 9, 2016

(65) Prior Publication Data
US 2016/0154770 A1  Jun. 2, 2016

Related U.S. Application Data

(63) Continuation of application No. 13/406,530, filed on Feb. 28, 2012, now Pat. No. 9,286,643.
(Continued)

(51) Int. Cl.
*G06F 17/00* (2019.01)
*G06F 17/22* (2006.01)
(Continued)

(52) U.S. Cl.
CPC .......... *G06F 17/22* (2013.01); *G06F 16/5838* (2019.01); *G06F 16/9535* (2019.01); *G06F 17/211* (2013.01); *G06Q 50/01* (2013.01)

(58) Field of Classification Search
CPC ............. G06F 17/211; G06F 17/30867; G06F 17/30056
See application file for complete search history.

(56) References Cited

U.S. PATENT DOCUMENTS 3,898,617 A   8/1975  Kashioka et al.
3,982,744 A   9/1976  Kraynak et al.
(Continued)

FOREIGN PATENT DOCUMENTS

AR      040044      3/2005
CN   203908912 U   10/2014
(Continued)

OTHER PUBLICATIONS

Alzheimer's Association, 2012 Alzheimer's Disease Facts and Figures, Mar. 2012, 2 pgs, downloaded from http://www.alz.org/documents_custom/2012_facts_figures_fact_sheet.pdf.
(Continued)

*Primary Examiner* — Laurie A Ries
(74) *Attorney, Agent, or Firm* — Frost Brown Todd LLC

(57) ABSTRACT

The present invention may provide a method and apparatus for building a personalized memory compilation for members of a group: providing digitally encoded images, text and other data; analyzing data; eliciting a characteristic of data; selecting a plurality of the provided data; arranging the provided data, to generate a personalized memory compilation; wherein at least one of a selecting or an arranging step is performed in response to elicited characteristics. Additionally, the invention may comprise a collaborative method and apparatus for gathering, enriching, preserving, and sharing memories for members of a group using the combination of 1) collaboration through nominal group recall and 2) recording of personal preferences to produce a digital asset that contains a unique blend of selected profiles, images, stories, personalized notes, and other relevant content from more than one group member to constitute a more complete and accurate rendering of an important occasion experienced by the group.

13 Claims, 5 Drawing Sheets

Related U.S. Application Data

(60) Provisional application No. 61/447,899, filed on Mar. 1, 2011.

(51) Int. Cl.
*G06F 16/583* (2019.01)
*G06F 16/9535* (2019.01)
*G06Q 50/00* (2012.01)
*G06F 17/21* (2006.01)

(56) References Cited

U.S. PATENT DOCUMENTS

| | | |
|---|---|---|
| 4,281,312 A | 7/1981 | Knudson |
| 4,805,327 A | 2/1989 | Buckley |
| 4,831,659 A | 5/1989 | Miyaoka et al. |
| 4,837,447 A | 6/1989 | Pierce et al. |
| 4,933,740 A | 6/1990 | Baliga et al. |
| 4,941,193 A | 7/1990 | Barnsley et al. |
| 5,065,447 A | 11/1991 | Barnsley et al. |
| 5,262,878 A | 11/1993 | Esserman |
| 5,271,071 A | 12/1993 | Waite |
| 5,274,466 A | 12/1993 | Ida et al. |
| 5,321,776 A | 6/1994 | Shapiro |
| 5,343,539 A | 8/1994 | Chan |
| 5,347,600 A | 9/1994 | Barnsley et al. |
| 5,384,867 A | 1/1995 | Barnsley et al. |
| 5,396,228 A | 3/1995 | Masood |
| 5,410,617 A | 4/1995 | Kidd et al. |
| 5,416,604 A | 5/1995 | Park |
| 5,416,856 A | 5/1995 | Jacobs et al. |
| 5,420,967 A | 5/1995 | Delp |
| 5,426,594 A | 6/1995 | Wright et al. |
| 5,430,812 A | 7/1995 | Barnsley et al. |
| 5,497,435 A | 3/1996 | Berger |
| 5,502,439 A | 3/1996 | Berlin |
| 5,510,838 A | 4/1996 | Yomdin et al. |
| 5,513,128 A | 4/1996 | Rao |
| 5,577,183 A | 11/1996 | Weyand |
| 5,600,373 A | 2/1997 | Chui et al. |
| 5,610,657 A | 3/1997 | Zhang |
| 5,701,369 A | 12/1997 | Moon et al. |
| 5,717,788 A | 2/1998 | Barnsley |
| 5,721,543 A | 2/1998 | Johnson et al. |
| 5,729,607 A | 3/1998 | Defries et al. |
| 5,732,158 A | 3/1998 | Jaenisch |
| 5,740,282 A | 4/1998 | Hurd |
| 5,754,702 A | 5/1998 | Simpson |
| 5,754,704 A | 5/1998 | Barnsley et al. |
| 5,787,201 A | 7/1998 | Nelson et al. |
| 5,809,169 A | 9/1998 | Rezzouk et al. |
| 5,822,721 A | 10/1998 | Johnson et al. |
| 5,838,820 A | 11/1998 | Bergman |
| 5,838,832 A | 11/1998 | Barnsley |
| 5,838,833 A | 11/1998 | Ishikawa et al. |
| 5,848,177 A | 12/1998 | Bauer et al. |
| 5,848,198 A | 12/1998 | Penn |
| 5,859,935 A | 1/1999 | Johnson et al. |
| 5,862,262 A | 1/1999 | Jacobs et al. |
| 5,862,263 A | 1/1999 | Kim et al. |
| 5,862,264 A | 1/1999 | Ishikawa et al. |
| 5,867,386 A | 2/1999 | Hoffberg et al. |
| 5,867,603 A | 2/1999 | Barnsley et al. |
| 5,870,502 A | 2/1999 | Bonneau et al. |
| 5,875,108 A | 2/1999 | Hoffberg et al. |
| 5,901,246 A | 5/1999 | Hoffberg et al. |
| 5,917,962 A | 6/1999 | Chen et al. |
| 5,920,477 A | 7/1999 | Hoffberg et al. |
| 5,924,053 A | 7/1999 | Horowitz et al. |
| 5,946,417 A | 8/1999 | Bonneau et al. |
| 5,974,188 A | 10/1999 | Ibenthal |
| 6,001,889 A | 12/1999 | Lefebvre |
| 6,004,061 A | 12/1999 | Manico et al. |
| 6,076,088 A | 6/2000 | Paik et al. |
| 6,081,750 A | 6/2000 | Hoffberg et al. |
| 6,092,049 A | 7/2000 | Chislenko et al. |
| 6,104,834 A | 8/2000 | Hull |
| 6,111,988 A | 8/2000 | Horowitz et al. |
| 6,125,143 A | 9/2000 | Suzuki et al. |
| 6,198,851 B1 | 3/2001 | Kato et al. |
| 6,229,931 B1 | 5/2001 | Essafi et al. |
| 6,266,451 B1 | 7/2001 | Charrier et al. |
| 6,285,794 B1 | 9/2001 | Georgiev et al. |
| 6,307,948 B1 | 10/2001 | Kawasaki et al. |
| 6,321,231 B1 | 11/2001 | Jebens et al. |
| 6,324,545 B1 | 11/2001 | Morag |
| 6,332,146 B1 | 12/2001 | Jebens et al. |
| 6,339,659 B1 | 1/2002 | Fukuhara et al. |
| 6,356,667 B1 | 3/2002 | Fukuhara |
| 6,373,989 B1 | 4/2002 | Fukuhara et al. |
| 6,389,181 B2 | 5/2002 | Shaffer et al. |
| 6,400,996 B1 | 6/2002 | Hoffberg et al. |
| 6,418,424 B1 | 7/2002 | Hoffberg et al. |
| 6,456,743 B1 | 9/2002 | Charrier et al. |
| 6,476,766 B1 | 11/2002 | Cohen |
| 6,480,541 B1 | 11/2002 | Girod et al. |
| 6,498,866 B2 | 12/2002 | Charrier et al. |
| 6,501,862 B1 | 12/2002 | Fukuhara et al. |
| 6,502,045 B1 | 12/2002 | Biagiotti |
| 6,526,178 B1 | 2/2003 | Fukuhara |
| 6,546,136 B1 | 4/2003 | Hull |
| 6,556,719 B1 | 4/2003 | Monro |
| 6,562,171 B1 | 5/2003 | Archie, Jr. et al. |
| 6,633,682 B1 | 10/2003 | Perlin |
| 6,636,648 B2 | 10/2003 | Loui et al. |
| 6,640,145 B2 | 10/2003 | Hoffberg et al. |
| 6,661,904 B1 | 12/2003 | Sasich et al. |
| 6,674,875 B1 | 1/2004 | Phillips et al. |
| 6,707,484 B1 | 3/2004 | Kawasaki et al. |
| 6,714,145 B1 | 3/2004 | Marques |
| 6,721,713 B1 | 4/2004 | Guheen et al. |
| 6,738,520 B1 | 5/2004 | Acharya et al. |
| 6,742,924 B2 | 6/2004 | Kearney |
| 6,775,411 B2 | 8/2004 | Sloan et al. |
| 6,906,719 B2 | 6/2005 | Chadha et al. |
| 6,928,397 B1 | 8/2005 | Matsushiro |
| 6,950,198 B1 | 9/2005 | Berarducci et al. |
| 7,046,728 B1 | 5/2006 | Acharya et al. |
| 7,046,862 B2 | 5/2006 | Ishizaka et al. |
| 7,061,491 B2 | 6/2006 | Happel |
| 7,075,986 B2 | 7/2006 | Girod et al. |
| 7,101,434 B2 | 9/2006 | Ugajin |
| 7,110,547 B2 | 9/2006 | Short |
| 7,110,613 B2 | 9/2006 | Muramatsu et al. |
| 7,148,990 B2 | 12/2006 | Atkins et al. |
| 7,209,885 B1 | 4/2007 | Shono et al. |
| 7,215,772 B2 | 5/2007 | Short |
| 7,215,776 B1 | 5/2007 | Short |
| 7,218,772 B2 | 5/2007 | Gleason et al. |
| 7,242,988 B1 | 7/2007 | Hoffberg et al. |
| 7,286,670 B2 | 10/2007 | Short |
| 7,287,225 B2 | 10/2007 | Mindrum |
| 7,293,019 B2 | 11/2007 | Dumais et al. |
| 7,296,023 B2 | 11/2007 | Geyer et al. |
| 7,321,919 B2 | 1/2008 | Jacobs et al. |
| 7,339,597 B1 | 3/2008 | Bourdev et al. |
| 7,373,302 B1 | 5/2008 | Jastrzebski et al. |
| 7,440,570 B2 | 10/2008 | Short |
| 7,454,163 B2 | 11/2008 | Kasahara et al. |
| 7,469,237 B2 | 12/2008 | Cooper |
| 7,474,801 B2 | 1/2009 | Teo et al. |
| 7,480,415 B2 | 1/2009 | Nicolai et al. |
| 7,487,155 B2 | 2/2009 | Jebens et al. |
| 7,508,325 B2 | 3/2009 | Monro |
| 7,511,638 B2 | 3/2009 | Monro |
| 7,511,639 B2 | 3/2009 | Monro |
| 7,525,680 B2 | 4/2009 | Berarducci et al. |
| 7,526,137 B2 | 4/2009 | Ishizaka |
| 7,545,291 B2 | 6/2009 | Monro |
| 7,548,176 B2 | 6/2009 | Monro |
| 7,586,424 B2 | 9/2009 | Monro |
| 7,602,316 B2 | 10/2009 | Monro |
| 7,614,837 B2 | 11/2009 | Anderson et al. |
| 7,663,671 B2 | 2/2010 | Gallagher et al. |

(56) References Cited

U.S. PATENT DOCUMENTS

| | | |
|---|---|---|
| 7,671,767 B2 | 3/2010 | Monro |
| 7,672,484 B2 | 3/2010 | Wiedemann et al. |
| 7,676,065 B2 | 3/2010 | Wiedemann et al. |
| 7,689,049 B2 | 3/2010 | Monro |
| 7,689,620 B2 | 3/2010 | Tan |
| 7,707,213 B2 | 4/2010 | Monro |
| 7,707,214 B2 | 4/2010 | Monro |
| 7,728,740 B2 | 6/2010 | Monro |
| 7,737,869 B2 | 6/2010 | Monro |
| 7,738,707 B2 | 6/2010 | Wiedemann et al. |
| 7,760,868 B2 | 7/2010 | Kawasaki et al. |
| 7,770,091 B2 | 8/2010 | Monro |
| 7,774,431 B2 | 8/2010 | Conn et al. |
| 7,783,079 B2 | 8/2010 | Monro |
| 7,786,903 B2 | 8/2010 | Monro |
| 7,786,907 B2 | 8/2010 | Monro |
| D623,193 S | 9/2010 | Cameron et al. |
| 7,791,513 B2 | 9/2010 | Monro |
| 7,809,206 B2 | 10/2010 | Ishizaka |
| 7,810,037 B1 | 10/2010 | Edwards et al. |
| 7,813,573 B2 | 10/2010 | Monro |
| 7,843,367 B2 | 11/2010 | Monro |
| 7,845,571 B2 | 12/2010 | Monro |
| 7,848,584 B2 | 12/2010 | Monro |
| 7,849,116 B2 * | 12/2010 | Jacobs .................. H04L 67/22 707/723 |
| 7,864,086 B2 | 1/2011 | Monro |
| 7,894,675 B2 | 2/2011 | Wiedemann et al. |
| D634,330 S | 3/2011 | Brown |
| D634,331 S | 3/2011 | Brown |
| 7,904,922 B1 | 3/2011 | Haberman et al. |
| 7,907,068 B2 | 3/2011 | Monro |
| D639,304 S | 6/2011 | Fujii et al. |
| 7,974,488 B2 | 7/2011 | Monro |
| 7,974,714 B2 | 7/2011 | Hoffberg |
| 7,975,227 B2 | 7/2011 | Covannon et al. |
| 7,983,446 B2 | 7/2011 | Wiedemann et al. |
| 7,987,182 B2 | 7/2011 | Slothouber |
| 7,990,289 B2 | 8/2011 | Monro |
| 8,122,335 B2 | 2/2012 | Duhig et al. |
| 8,219,513 B2 | 7/2012 | Covannon et al. |
| 8,250,145 B2 | 8/2012 | Zuckerberg et al. |
| 8,275,733 B2 | 9/2012 | McCullough et al. |
| 8,285,084 B2 | 10/2012 | Yoda |
| 8,396,297 B2 | 3/2013 | Panda |
| 8,478,645 B2 | 7/2013 | Russek |
| 8,520,979 B2 | 8/2013 | Conwell |
| 8,527,564 B2 | 9/2013 | Zwol et al. |
| 8,539,359 B2 | 9/2013 | Rapaport et al. |
| 8,543,573 B2 | 9/2013 | MacPherson |
| 8,694,896 B2 | 4/2014 | Edwards et al. |
| 8,768,804 B2 | 7/2014 | Holten et al. |
| 8,819,156 B2 | 8/2014 | Miner et al. |
| 8,832,119 B2 | 9/2014 | Girgensohn et al. |
| 8,841,451 B2 | 9/2014 | Newkome et al. |
| 8,965,136 B2 | 2/2015 | Jaffe et al. |
| 9,098,531 B2 | 8/2015 | Desmond et al. |
| 9,143,742 B1 | 9/2015 | Amira et al. |
| 9,152,292 B2 | 10/2015 | Xiao et al. |
| 9,286,643 B2 | 3/2016 | Reinders et al. |
| 9,349,786 B2 | 5/2016 | Elshurafa et al. |
| 9,614,024 B2 | 4/2017 | Elshurafa et al. |
| 9,882,946 B2 | 1/2018 | Bosworth et al. |
| 2001/0041020 A1 * | 11/2001 | Shaffer .............. H04N 1/00132 382/305 |
| 2002/0001102 A1 | 1/2002 | Williams |
| 2002/0049783 A1 * | 4/2002 | Berk .................. G06Q 30/02 715/202 |
| 2003/0069732 A1 | 4/2003 | Stephany et al. |
| 2003/0072486 A1 * | 4/2003 | Loui .................. G06T 11/60 382/175 |
| 2003/0151310 A1 | 8/2003 | Yu |
| 2003/0182246 A1 | 9/2003 | Johnson et al. |
| 2004/0051295 A1 | 3/2004 | Gross et al. |
| 2005/0033623 A1 | 2/2005 | Zemborain |
| 2005/0117527 A1 | 6/2005 | Williams et al. |
| 2005/0196735 A1 | 9/2005 | Buschke |
| 2005/0289461 A1 * | 12/2005 | Amado .................. G06Q 10/10 715/255 |
| 2006/0041632 A1 | 2/2006 | Shah et al. |
| 2006/0109516 A1 | 5/2006 | Catalan et al. |
| 2006/0293921 A1 * | 12/2006 | McCarthy ............ A61B 5/6815 705/2 |
| 2007/0078849 A1 * | 4/2007 | Slothouber ....... G06F 17/30867 |
| 2007/0124282 A1 * | 5/2007 | Wittkotter ......... G06F 17/30858 |
| 2008/0068665 A1 | 3/2008 | Niblett et al. |
| 2008/0163118 A1 | 7/2008 | Wolf |
| 2008/0263053 A1 | 10/2008 | Hull |
| 2009/0019348 A1 | 1/2009 | King |
| 2009/0171902 A1 | 7/2009 | MacLaurin et al. |
| 2010/0042915 A1 | 2/2010 | Ohara et al. |
| 2011/0035678 A1 | 2/2011 | Hamrick et al. |
| 2011/0246945 A1 | 10/2011 | Caine et al. |
| 2011/0283172 A1 * | 11/2011 | Berger .................. G06Q 10/10 715/202 |
| 2012/0054589 A1 | 3/2012 | Berger et al. |
| 2012/0197856 A1 | 8/2012 | Banka et al. |
| 2012/0246562 A1 | 9/2012 | Maness et al. |
| 2012/0265758 A1 | 10/2012 | Han et al. |
| 2013/0038756 A1 | 2/2013 | Cheng |
| 2013/0081036 A1 | 3/2013 | Cohen et al. |
| 2013/0124980 A1 | 5/2013 | Hudson et al. |
| 2014/0310351 A1 | 10/2014 | Danielson et al. |
| 2016/0042140 A1 | 2/2016 | Reinders et al. |
| 2018/0108437 A1 | 4/2018 | Reinders et al. |

FOREIGN PATENT DOCUMENTS

| | | |
|---|---|---|
| EP | 2904887 A | 8/2015 |
| WO | WO 01/82231 | 11/2001 |
| WO | WO 2010/003003 A | 1/2010 |
| WO | WO 2012/034106 A | 3/2012 |
| WO | WO 2014/055573 | 4/2014 |

OTHER PUBLICATIONS

Applaud, "Personalized Memory Collection for Collaboration Reminiscence Therapy with Service Members Undergoing Rehabilitation for Traumatic Brain Injury", 2013.

Applaud, "Personalized Memory Collection for Collaborative Reminiscence Therapy with Service Members Undergoing Physical Rehabilitation", 2013.

Arrighi, H.M., et al., "Lethality of Alzheimer disease and its impact on nursing home placement", Alzheimer Dis Assoc Disord, 2010, vol. 24, pp. 90-95.

Baecker, R., et al., "Multimedia biographies for individuals with Alzheimer's disease and their families", University of Toronto Knowledge Media Design Institute and Baycrest MedNet, 2006, 3 pgs.

Barnier, A.J., et al., "From individual to collective memory: theoretical and empirical perspectives", Memory, 2008, vol. 16, Issue 3, pp. 177-182.

Bartz, J.A., et al., "The neuroscience of affiliation: Forging links between basic and clinical research on neuropeptides and social behavior", Horm Beha, 2006, vol. 50, pp. 518-528.

Betts, K.R., et al., "Collaborative Group Memory: Processes, Performance, and Techniques for Improvement", Social and Personality Psychology Compass, Feb. 2010, vol. 4, Issue 2, pp. 119-130.

Boscarino, J.A., "Post-traumatic stress and associated disorders among vietnam veterans: The significance of combat exposure and social support", J Trauma Stress, 1995, vol. 8, pp. 317-336.

Burns, A. et al., "Cause of death in Alzheimer'disease", Age Ageing, 1990, vol. 19, pp. 341-344.

Cappa, S.F., et al., "EFNS guidelines on cognitive rehabilitation: report of an EFNS task Force", Eurpoean Journal of Neurology, 2005, vol. 12, pp. 665-680.

Charnelian, L, et al. "The effect of major depression on subjective and objective cognitive deficits in mild to moderate traumatic brain injury", J Neuropsychiatry Clin Neurosci., 2006; vol. 18, pp. 33-38.

(56) References Cited

OTHER PUBLICATIONS

Charney, D.S., "Psychobiological mechanism of resilience and vulnerability: Implications for successful adaptation to extreme stress", Am J Psychiatr, 2004, vol. 161, pp. 195-216.

Cicerone, K.D., et al., "Evidence-Based Cognitive Rehabilitation: Updated Review of the Literature From 1998 through 2002", Archives of Physical Medicine and Rehabilitation (Elsevier), Aug. 2002, vol. 86, Issue 8, pp. 1681-1692.

Cifu, D.X., et al., "The Polytrauma Rehabilitation System of Care Programs at the Richmond Veterans Administration Medical Center", Crit Rev Phys Rehabil Med, 2009, vol. 21, Issue 3-4, pp. 197-213.

Clayton, K., et al. "Fractal Memory for Visual Form", Presented to the Society for Chaos Theory in Psychology and the Life Sciences, Berkley, CA, Jun. 1996.

Cohen, S., et al., "Social relationships and Health", Am Psychol, 2004, vol. 59, pp. 676-684.

Cohn-Kerr, N., "Understanding the process of adjustment to disability", Journal of Rehabilitation, 1961, vol. 27, pp. 16-18, Abstract Only.

Coleman, E.A, "Falling Through the Cracks: Challenges and Opportunities for Improving Transitional Care for Persons with Continuous Complex Care Needs", J Am Geriatr Soc, 2003, vol. 51, pp. 549-555.

Crampes, M., et al., "Visualizing Social Photos on a Hasse Diagram for Elicitng Relations and Indexing New Photos," IEEE Transactions on Visualization and Computer Graphics, Nov.-Dec. 2009, 15(6):985-992, 8 pgs.

Cummings, J., et al., *Dementia, clinical approach*, 2nd ed. Jeffrey; International Journal of Geriatric Psychiatry, 1992, vol. 7, Issue 12, p. 920.

Dartmouth Undergraduate Journal of Science, "Stress Diagram", 1 pg. http://dujs.dartmouth.edu/wp-content/uploads/2011/02/stressdiagram.jpg, accessed Feb. 2, 2014.

Ditzen, B., et al., "Effects of different kinds of couple interaction on cortisol and heart rate responses to stress in women", Psychoneuroendocrinology, 2007, vol. 32, pp. 565-574.

Dobrez, D., et al., "Impact of mental disorders on cost and reimbursement for patients in inpatient rehabilitation facilities", Arch Phys Med Rehabil., 2010, vol. 91, pp. 184-188.

Ekeocha, J., et al., "Collaborative recall in face-to-face and electronic groups", Memory, 2008, vol. 16, Issue 3, pp. 245-261.

Fann, J.R., et al., "Psychiatric disorders and functional disability in outpatients with traumatic brain injuries", Am J Psychiatry., 1995, vol. 152, pp. 1493-1499.

Faul, M., et al., "Traumatic Brain Injury in the United States: Emergency Department Visits, Hospitalizations and Deaths 2002-2006", U.S. Department of Health and Human Services, Center for Disease Control and Prevention, National Center for Injury Prevention and Control; Mar. 2010, 74 pgs. http://www.cdc.gov/traumaticbraininjury/pdf/blue_book.pdf.

Ferri, C.P., et al., "Global prevalence of dementia: a Delphi consensus study", Lancet 2005, vol. 366, pp. 2112-2117.

Francis, P.T., et al., "Neurochemical studies of early-onset Alzheimer's disease: possible influence on treatment", N Engl J Med, 1985, vol. 313, pp. 7-11. Abstract only.

Fredrickson, B. L., et al., "What good are Positive Emotions in Crises? A prospective study of resilience and emotions following the terrorist attacks on the United States on September 11th, 2001", Journal of Personality and Social Psychology, 2003, vol. 84, Issue 2, pp. 365-376.

Ganguli, M., et al., "Alzheimer Disease and Mortality: A 15-year Epidemiological Study", Arch Neurol, 2005, vol. 62, pp. 779-784.

Harris, C.B., et al., "Collaborative recall and collective memory: What happens when we remember together?", Memory, 2008, vol. 16, Issue 3, pp. 213-230.

Herbert, LE., et al., "Alzheimer disease in the U.S. population: Prevalence estimates using the 2000 Census", Archives of Neurology, 2003, vol. 60, No. 8, pp. 1119-1122.

Heinrichs, M. et al., "Social support and oxytocin interact to suppress cortisol and subjective responses to psychosocial stress", Biol Psychiatry, 2003, vol. 54, pp. 1389-1398.

Heinrichs, M., et al., "Neuropeptides and social behavior: effects of oxytocin and vasopressin in humans", Prog Brain Res., 2008, vol. 170, pp. 337-350.

Hibbard, M.R., et al., "Axis I psychopathology in individuals with traumatic brain injury", J Head Trauma Rehabil., 1998, vol. 13, pp. 24-39.

Hirst, W., et al., "Towards a psychology of collective memory", Memory, 2008, vol. 16, Issue 3, pp. 183-200.

Hoffmann, U., et al., "Threshold electrotonus measurements in the diagnosis and follow up of ALS patients", Electroencephalography and Clinical Neurophysiology, 1996, 99:4, pp. 348-349. Abstract only.

Hoogendijk, W.J., et al., "Image alalyser-assisted morphometry of the locus coeruleus in Alzheimer's disease, Parkinson's disease and amyotrophic lateral sclerosis", Brain, 1995, vol. 118(part 1), pp. 131-143.

Hyer, R., "Iraq and Afghanistan Producing New Pattern of Extremity War Injuries", Medscape Medical News, Mar. 27, 2006, 4 pgs.

Inglis, E.A., et al., Usable technology? Challenges in designing a memory aid with current electronic devices, Neuropsychological Rehabilitation, 2004, vol. 14, Issue 1-2.

Jaffee, MD, M.S., et al., "Acute clinical care and care coordination for traumatic brain injury within Department of Defense", Journal of Rehabilitation Research & Development, 2000, vol. 46, pp. 655-666.

Jenkins, K., et al., "Reminiscence and acquired brain injury", Social Care and Neurodisability, 2010, vol. 1, Issue 2, pp. 14-21. Abstract only.

Johnson, E.O. et al., "Mechanisms of Stress: A Dynamic Overview of Hormonal and Behavioral Homeostasis", Neurosci Biohav Rev, 1992, vol. 16, pp. 115-130.

Karlamangla, A.S., et al., "Allostatic load as a predictor of functional decline. MacArthur studies of a successful aging", J Clin Epidemiol, 2002, vol. 55, pp. 696-710.

Kasl-Godley, J. et al., "Psychosocial Interventions for Individuals With Dementia: An Integration of Theory, Therapy, and a Clinical Understanding of Dementia", Clinical Psychology Review, 2000, vol. 20, No. 6, pp. 755-782.

Kiernat, J., "The use of life review activity with confused nursing home residents", Am J Occup Ther, May 1979, vol. 33, No. 5, pp. 306-310. Abstract only.

Lew, H.L., et al., "Auditory and visual impairments in patients with blast-related traumatic brain injury: effect of dual sensory impairment on functional independence measure", J. Rehabil. Res. Dev., 2009, vol. 46, pp. 819-826.

Luthar, S.S. et al., "The Construct of Resilience: A Critical Evaluation and Guidelines for Future Work", Child Development, 2000, vol. 71, Issue 3, pp. 543-562.

Manne, S.L., et al., "Spouse support, coping, and mood among individuals with cancer", Ann Behav Med, 1999, vol. 21, pp. 111-121.

Matthews, K.L., et al., "Noradrenergic changes, aggressive behavior, and cognition in patients with dementia", Biol Psychiatry, 2002, vol. 51, pp. 407-416.

McPherson, A., et al., "Effects of individualized memory aids on the conversation of persons with severe dementia: A pilot study", Aging & Mental Health, vol. 5, Issue 3, 2001, pp. 289-294.

Medicare Payment Advisory Commission (MedPAC) report letter to the U.S. Senate regarding access to outpatient physical therapy (PT) services and comprehensive rehabilitation facility services, Dec. 30, 2014, 15 pgs.

Michalak, E.E., et al., "Seasonality, negative life events, and social support in a community sample", Br J Psychiatry, 2003, vol. 182, pp. 434-438.

Miller, G.E., et al., "If It Goes Up, Must It Come Down? Chronic Stress And The Hypothalamic-Pituitary-Adrenocortical Axis in Humans", Psychological Bulletin, Jan. 2007, vol. 133(1), pp. 25-45.

Mitchell, S.L., et al., "A National Study of the Location of Death for Older Persons With Dementia", J Am Geriatr Soc, 2005, vol. 53, pp. 299-305.

(56) References Cited

OTHER PUBLICATIONS

Mohr, D.C., et al., "The relationship between social support, depression, and treatment for depression in people with multiple sclerosis", Psychol Med, 2004, vol. 34, pp. 533-541.
Moldover, J.E., et al., "Depression after traumatic brain injury: a review of evidence for clinical heterogeneity", Neuropsychol Rev., 2004; vol. 14, pp. 143-154.
Mooney, G., et al., "Factors related to recovery after mild traumatic brain injury", Brain Inj., 2005; vol. 19, pp. 975-987, Abstract only.
Morriss, Esq., W., Description of Pre-filing Tests, 2015, 9 pgs.
Neumann, I.D., "Involvement of the brain oxytocin system in stress coping: interactions with the hypothalamo-pituitaryadrenal axis", Prog. Brain Res., 2002, vol. 139, pp. 147-162.
Newman, R., "APA's Resilience Initiative", Professional Psychology: Research and Practice, 2005, Vil. 36, No. 3, 227-229, 3 pgs.
Okie, S., MD., "Traumatic Brain Injury in the War Zone", N Engl J Med, 2005, vol. 352, pp. 2043-2047.
Orii, Y., et al., "Web-based Intelligent Photo Browser for Flood of Personal Digital Photographs," In: 2008 IEEE/WIC/ACM International Conference on Web Intelligence and Intelligent Agent Technology, Dec. 9, 2008, pp. 121-130, 4 pgs.
Oxman, T.E., et al., "Social Support and Treatment Response in Older Depressed Primary Care Patients", J Gerontol B Psychol Sci Soc Sci, 2001, vol. 56, pp. P35-45.
Parks, R.W. et al., *Neuropsychology of Alzheimer's Disease and Other Dementias*, Oxford University Press (hardcover) 1993, Bibliography only.
Paykel, E.S. "Life events, social support and depression", Acta Psychiatr Scand Suppl., 1994, vol. 377, pp. 50-58.
Perlesz, A., et al., "Psychological distress and family satisfaction following traumatic brain injury: injured individuals and their primary, secondary, and tertiary careers", J Head Trauma Rehabil, 2000, vol. 15, Issue3, pp. 909-929.
Pittiglio, L., MSN, RN, "Use of Reminiscence Therapy in Patients With Alzheimer's Disease", Lippincott's Case Management, 2000, Vo. 5, No. 6, pp. 216-220.
Plassman, B.L., et al., "Prevalence of Dementia in the United States: The Aging, Demographics, and Memory Study", Neuroepidemiology, Nov. 2007, vol. 29, No. 1-2, pp. 125-132.
Prigatano, G.P., "A history of cognitive rehabilitation" from *The Effectiveness of Rehabilitation for Cognitive Deficits*, P.W. Halligan and D.T. Wade, eds., 2005, New York: Oxford University Press, pp. 3-11, Abstract only.
Reese, E., et al., "The development of collective remembering", Memory, 2008, vol. 16, Issue 3, pp. 201-212.
Resick, P.A., *Stress and Trauma*. New York, NY: Psychology Press; 2001.
"Returning Home from Iraq and Afghanistan: Preliminary Assessment of Readjustment Needs of Veterans, Service Members, and Their Families", Institute of Medicine of the National Academies, Washington, D.C.: The National Academies Press, 2010, 197 pgs.
Revenson, T.A., et al., "Social Support as a Double-Edged Sword: The Relation Of Positive and Problematic Support to Depression Among Rheumatoid Arthritis Patients", Soc Sci Med, 1991, vol. 33, pp. 807-813.
Russ, J.C., *Fractal Surfaces*, 1994, Plenum Press, New York.
Sandberg, M. A., et al., "Beyond Diagnosis: Understanding the healthcare challenges of injured veterans through the application of the International Classification of Functioning, Disability and Health", The Clinical Neuropsychologist, 2009, vol. 23, Issue 8.
Sarne-Fleischmann, V., et al., "Development and evaluation of a personalised multimedia Alzheimer's patients", International Journal of Social and Humanistic Computing, 2008, vol. 1, No. 1.
Sayal, K., et al., "Effects of social support during weekend leave on cortisol and depression ratings: A pilot study", J Affect Dis, 2002, vol. 71, pp. 153-157.
Sayer, N.A., et al., "Rehabilitation Needs of Combat-Injured Service Members Admitted to the VA Polytrauma Rehabilitation Centers: The Role of PM&R in the Care of Wounded Warriors", PM&R, Jan. 2009, vol. 1, Issue 1, pp. 23-28.

Schacter, D., "Implicit Memory: History and Current Status", Journal of Experimental Psychology Learning, Memory, and Cognition, 1987, vol. 13, No. 3, pp. 501-518.
Schwarzbold, M. et al., "Psychiatric disorders and traumatic brain injury", Neuropsychiatr Dis Treat, 2008, vol. 4, Issue 4, pp. 797-816.
Shneiderman, B., "Meeting human needs with new digital imaging technologies," IEEE MultiMedia, Oct.-Dec. 2002, 9(4):8-14, 7 pgs.
Silver, J.M., et al., "The association between head injuries and psychiatric disorders: findings from the New Haven NIMH Epidemiologic Catchment Area Study", Brain Inj. 2001.
Sitzer, D.I., et al., "Cognitive training in Alzheimer's disease: a meta-analysis of the literature", Acta Psychiatrica Scandinavica, 2006, vol. 114, Issue 2, pp. 75-90.
Smith, S.M., et al., "The role of the hypothalamic-pituitary-adrenal axis in neuroendocrine responses to stress", Dislogues Clin Neurosci, 2006, vol. 8(4), pp 383-395.
Sohlberg, M.M., et al., "Evidence-Based Practice for the Use of External Aids as a Memory Rehabilitation Technique", Journal of Medical Speech Pathology, 2007, 15:1, pp. xv-li.
Stansfeld, S.A., et al., "Work and psychiatric disorder in the whitehall II study", J Psychosom Res, 1997, vol. 43, pp. 73-81.
Steptoe, A., et al., "Loneliness and neuroendocrine, cardiovascular, and inflammatory stress responses in middle-aged men and women", Psychoneuroendocrinology, 2004, vol. 29, pp. 593-611.
Subramaniam, P., et al., "The impact of individual reminiscence therapy for people with dementia: Systematic review", Expert Review of Neurotherapeutics, 2012, vol. 12, No. 5, pp. 545-555.
Terrio, H., et al., "Traumatic brain injury screening: preliminary findings in a US Army Brigade Combat Team", J. Head Trauma Rehabil, 2009, vol. 24, pp. 14-23.
The hypothalamic-pituitary-adrenal (HPA) axis courtesy of CNSforum, 2001, 2 pgs.
Topo, P., et al., eds. "Enabling Technologies for People with Dementia " Report of Picture Gramophone assessment: National findings from Finland, Ireland, Norway and UK and cross national results, Oct. 5, 2004.
Travis, L.A., et al., "Social support, depression, and functional disability in older adult primary-care patients", Am J Geriatr Psychiatry, 2004, vol. 12, pp.265-271.
Tugade, M. M., et al. "Psychological Resilience And Positive Emotional Granularity: Examining the Benefits of Positive Emotions On Coping And Health", Journal of Personality, 2004, vol. 72, Issue 6, pp. 1161-1190.
Turner, B., et al., "A qualitative study of the transition from hospital to home for individuals with acquired brain injury and their family caregivers", Brain Inj., 2007, vol. 21, Issue 11, pp. 1119-1130.
Turner, B., et al., "Perceptions of recovery during the early transition phase from hospital to home following acquired brain injury: a journey of discovery", Neuropsychological Rehabilitation, 2011, vol. 21, Issue 1, pp. 64-91.
Turner, B., et al., "Profiling early outcomes during the transition from hospital to home after brain injury", Brain Injury, 2009, vol. 23, Issue 1, pp. 51-60.
Turner, B.J., et al., "Perceived service and support needs during transition from hospital to home following acquired brain injury", Disability and Rehabilitation, 2011, vol. 33, Issue 10, pp. 818-829.
Turner, B.J., et al., "The transition from hospital to home for individuals with acquired brain injury: a literature review and research recommendations", Disabl Rehabil, 2008, vol. 30, Issue 16, pp. 1153-1176.
U.S. Department of Health and Human Services, National Plan to Address Alzheimer's Disease, May 2012.
Uchino, B.N., et al., "The relationship between social support and physiological processes: a review with emphasis on underlying mechanisms and implications for health", Psychol Bull, 1996, vol. 119, pp. 488-531.
Ungar, M., "Resilience across Cultures", British Journal of Social Work, 2008, vol. 38, Issue 2, pp. 218-235.
Venkatesh, S., et al., "You Tube and I Find—Personalized Multimedia Content Access," Proceedings of the IEEE, Apr. 2008, 96(4): 697-711, 15 pgs.

(56) References Cited

OTHER PUBLICATIONS

Vos, P.E., et al., "Mild traumatic brain injury", European Journal of Neurology, 2012, vol. 19, pp. 191-198.

Weldon, M.S., et al. "Collective Memory: Collaborative and Individual Processes in Remembering", Journal of Experimental Psychology: Learning, Memory, and Cognition 1997, vol. 23, No. 5, pp. 1160-1175.

Winstanley, J., et al., "Early indicators and contributors to psychological distress in relatives during rehabilitation following severe traumatic brain injury: findings from the Brain Injury Outcomes Study", J Head Trauma Rehabil, 2006, vol 21, Issue 6, pp. 453-466.

Woods, B., "Management of memory impairment in older people with dementia", International Review of Psychiatry, vol. 6, Issue 2-3, 1994, pp. 153-161.

World Health Organization: World Health Report 2003—Shaping the future. WHO; Geneva:2003, 204 pgs.

Yehuda, R. "Current status of cortisol findings in posttraumatic stress disorder", Psychiatr Clin N Am, 2002, vol. 25, pp. 341-368.

Zaloshnja, E., et al., "Prevalence of Long-Term Disability From Traumatic Brain Injury in the Civilian Population of the United States, 2005", Journal of Head Truama Rehabilitation (2008): Nov./Dec. 2008, vol. 23, Issue 6, pp. 394-400.

Zatzick, D., et al., "A National US Study of Posttraumatic Stress Disorder, Depression, and Work and Functional Outcomes After Hospitalization for Traumatic Injury", Annals of Surgery, 2008, vol. 248, Issue 3, pp. 429-437.

US Office Action, Non-Final, dated Sep. 12, 2016 for U.S. Appl. No. 14/191,430, 7 pgs.

US Office Action, Final, dated Jun. 16, 2017 for U.S. Appl. No. 14/191,430, 8 pgs.

International Search Report and Written Opinion dated Jul. 31, 2013 for Application No. PCT/US2013/000049, 14 pgs.

International Search Report and Written Opinion dated Sep. 12, 2016 for Application No. PCT/US2016/016969, 9 pgs.

\* cited by examiner

PERSONALIZED MEMORY COMPILATION FOR MEMBERS OF A GROUP AND COLLABORATIVE METHOD TO BUILD A MEMORY COMPILATION

CROSS-REFERENCE TO RELATED APPLICATION

This application claims priority from, and is a continuation of, U.S. Non-Provisional patent application Ser. No. 13/406,530, filed on Feb. 28, 2012, which itself claims priority from U.S. Provisional Patent Application Ser. No. 61/447,899, filed on Mar. 1, 2011, the disclosures of which are incorporated herein by reference.

BACKGROUND OF THE INVENTION

The present invention relates generally to creation and/or publishing of personalized memory compilations for members of a group and, more particularly, to a method for gathering, enriching, preserving, and sharing memories for members of a group using the combination of 1) collaboration through nominal group recall and 2) recording of personal preferences to produce a digital or printed asset that contains a blend of selected profiles, images, stories, personalized notes, and other relevant content from more than one group member and constitutes rendering of an important experience of the group.

Life's most meaningful events are often shared experiences with a group of family or friends. Participants have a strong desire to preserve and share the memories of these milestone occasions, as evidenced by the more than 50 billion digital photos taken last year; an increase of about 10 billion over just a few years ago.

The success of online social networks demonstrates that people want to preserve and share their stories in their own special way. They often care what others think, demonstrate a strong desire for personalization and employ technology with ease.

Many consumers demand personalized interaction. With the advent of high speed, high quality, digital print engines and software that can integrate fixed and variable content, variable data communication (VDC)—also called cross media communication—represents a major shift in technology and strategy to provide highly relevant, one-to-one communication with customers. Cross media communication represents advanced techniques and supporting technology that helps producers and marketers keep pace with customers' expectations regarding media. Many consumers demand personalized interaction. VDC enhances the value of communication by making the level and depth of conversation personal and powerful. Although measures of return on investment vary according to the selected media, response rates for VDC are often much higher than static media.

This major shift in technology has served to stimulate a high-growth market for custom photo books. On-demand publishers allow authors or photographers to print factory-bound, hard and soft cover books from a digital source for a low price. Consumers upload their photos and descriptions, and then print as many or as few books as they want. From a time and cost-saving perspective, these services have become useful for people who used to create their own photo albums and scrap books. Now they can save money by not printing individual photographs or purchasing albums and scrapbooking materials. Still, with photo book providers' current offerings, creating a unique photo book for more than one member of a group requires an extensive commitment of time, energy, and money.

The present invention addresses the challenge of collecting images and stories from a group of people, then assembling them as a personalized memory compilation in a way that preserves memories by: gathering and blending stories; images and other associated content from members of a group; creating a series of custom memory compilations where each one may be distinct and personalized to the group member; and replicating the process for a number of groups simultaneously.

SUMMARY OF THE INVENTION

In one aspect of the present invention, a method of generating a memory compilation, such as an album, comprises providing a plurality of digitally encoded images, text and/or other data; analyzing visual data within one of the provided images; determining a characteristic of at least one of the provided images; selecting a plurality of the provided images; arranging the provided images, text, and data to generate a memory compilation; wherein at least one of the selecting or the arranging steps may be performed in response to the determined characteristic.

In another aspect of the present invention, a method of generating a memory compilation comprises: providing a plurality of digitally encoded images, text and/or other data; providing an external format of the memory compilation; selecting one or more of the provided images, text and/or other data; arranging the selected content, by a processor, according to the external format of the memory compilation. The method may include steps of selecting output options in a variety of media that may include digital forms and full-color printed compilations, such as books.

In a further aspect of the present invention, a method of generating a memory compilation, comprises a network connector, adapted to receive data from a computer network; an image store, which receives and stores a plurality of digitally encoded images from the computer network; an image analyzer, which analyzes the visual data of at least some of the images; and an image arranger which generates an arrangement of images, for an album, for at least some of the plurality of images, responsive to the analysis.

Another aspect of this invention may include a text analyzer, which analyzes text data; and a text arranger which generates an arrangement of text for at least some of the text content, responsive to the analysis; and implements a method for selecting output options.

As used herein, the term "memory compilation" or "memory book" should be considered not in the limiting fashion of a tangible book, but in the sense of a collection of media, such as images, text, video, audio, or other media in a set, such as an album. A group memory book may be understood as a compilation of memories elicited from a group. Although a school yearbook is described herein as one example of a memory compilation, any description of a yearbook should be understood as merely one example of many different embodiments of the present invention. Yearbooks have been available for decades, and nearly every school produces one. But continually declining sales in the yearbook industry reflect their decreasing relevance for students. Over time, in an effort to guarantee the inclusion of every student, team, and group, many yearbooks have come to mean less to individuals and more to the collective. They now serve primarily an institutional purpose—representing the institution at a particular point in time rather than the participants. Recognizing the customization trend, the yearbook industry has begun to offer modest customization options. Since most manufacturers rely on less expensive but less flexible offset printing, the custom options are limited to printing and embossing on the cover or a digitally printed insert of just a few pages. While these options have temporarily boosted the faltering sales of yearbooks, they generally lack the customization and personalization young people have come to expect and demand. Yearbooks contain the exact same school information for each student. There is limited personalization or customization and each student receives the same content. The present invention may contain a large portion of personalized and customized information, information completely unique to that student. There may be portions of the compilation that are the same (e.g., teacher profiles, administrator profiles, coach profiles, school profiles), but one of the aspects that makes the present invention unique is that each student will receive a compilation that is highly personalized.

The content provided by each user is enriched by the output produced through the process. Participants find new information about the shared experience (information shared among others they selected for inclusion in their compilation, but about which they were not previously aware) which may change the way their memories are perceived and later recalled.

One embodiment of the present invention may comprise a memory compilation for students (middle school, high school, college, university and the like); a full color, digital or printed, version of a collection of student and faculty profiles married with other school content and personalized content to create a unique and individualized keepsake that may be printed as a group photo book to commemorate the school year or graduation. Variable data composition may be performed to allow each compilation to contain unique information for each student, teacher, coach, or administrator. Each compilation may be tailored to a particular participant. The invention may feature the collecting of data and information specific to a participant (e.g., a letter from his/her parents, a personal thank-you note from the student to their parents, unique comments, and photos sent by school friends, teachers, administrators, and/or coaches).

Another embodiment of the present invention may comprise a memory compilation for sports teams; a full color, digital or printed, version of a collection of player, coach and officials' profiles married with other team content and personalized content to create a unique and individualized compilation that may be printed as a group photo book to commemorate the sports season. Variable data composition may be performed to allow each compilation to contain unique information for each player, coach, and/or official. Each compilation may be tailored to a particular participant. The invention may comprise the collection of data and information specific to a participant. (e.g., a letter from his/her parents or coach, a personal thank-you note from the player to parents, coach or others, unique comments and photos sent by other players, coaches, family members, friends, or members of other teams).

The invention may further entail a method for creating a story by multiple collaborators supplying content associated with a story concept that comprises; receiving a concept for a story, the story concept including an indication of one or more editors that are selected to edit the story by an originator of the story concept, determining whether the story concept includes content that meets a predetermined criteria set by a party separate from the multiple collaborators and excluding the story concept if the concept fails to meet the predetermined criteria, making the story concept available for online access to enable the multiple collaborators to submit story content related to elements in the story concept, accepting the received story content associated with the story concept from the multiple collaborators if the received story content meets the predetermined criteria, accepting related story content such as comments or votes received through a wide area network connection from one or more editors and at least one of the multiple collaborators, creating a personalized story for each participant by including story content selected from one or more collaborators based on the participant's expressed preferences, and providing output options in a variety of media that may include digital forms and full color printed books or types of compilations.

The invention may further entail a method for creating a story by multiple collaborators supplying content associated with a story concept that comprises; receiving a story concept for a story, the story concept including an indication of one or more editors that are selected to edit the story by an originator of the story concept, determining whether the story concept includes content that meets a predetermined criteria set by a party separate from the multiple collaborators and deleting the story concept if the concept fails to meet the predetermined criteria, making the story concept available for online access to enable the multiple collaborators to submit competing story content related to elements in the story concept, accepting the received competing story content associated with the story concept from the multiple collaborators if the received competing story content meets the predetermined criteria, determining selected story content from the accepted competing story content submitted from each of the multiple collaborators that is approved for inclusion in the story based on votes received through a wide area network connection from the one or more editors and at least one of the multiple collaborators, creating the story from the selected story content that is approved, and deleting the accepted competing story content if the received votes have failed to approve the content.

The present invention may provide a collaborative method to capture and preserve the memories of group members and present the memories in a keepsake memento, such as a memory compilation.

These and other aspects, objects, features, and advantages of the present invention, are specifically set forth in, or will become apparent from, the following detailed description of an exemplary embodiment of the invention when read in conjunction with the accompanying drawings.

DETAILED DESCRIPTION OF THE INVENTION

Figure 1:
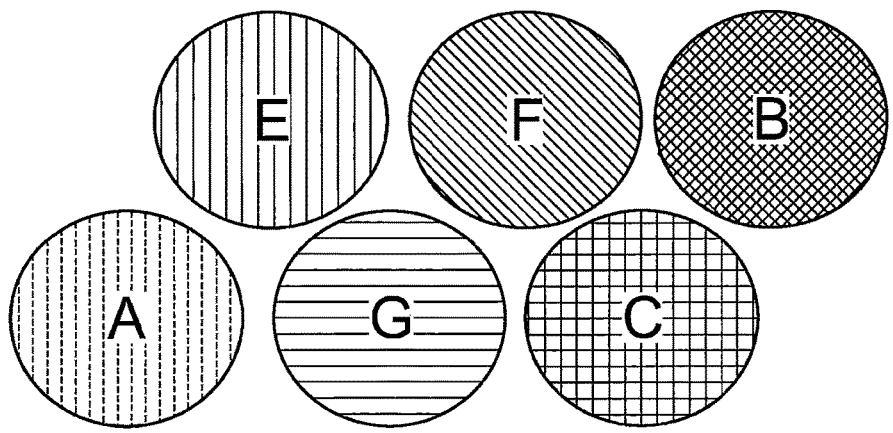
FIG. 1 is a plan diagram of group members sharing information separately, according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

One area of memory research has been on the effect of collaboration among group members on individual and collective memory. The goal has been to gain a better understanding of the costs and benefits of collaboration and how individual memory constrains and contributes to group memory. Also, research has shown how groups shape individual memory. Some findings include: remembering with others is different from remembering alone; collaborating increases confidence, completeness, and accuracy of recall; nominal group recall (the pooled sum of information remembered by individuals) produces more information than fully collaborative groups; group recall can influence subsequent memory of individuals, affecting accuracy and completeness; group recall leads some participants to new information, which can change the way their memories are perceived and recalled; and relationships among group members affect how much, and how well, each member remembers.

One option for understanding these and other findings is using complex systems theory. Complex systems are composed of interconnected parts that as a whole exhibit one or more properties that are not obvious based on the properties of the individual parts. Complex systems theory is focused on analyzing organized but unpredictable behaviors of complex systems found in nature. Some of the characteristics of complex systems include self-organization, non-linearity, order/chaos dynamism, and emergent properties.

In complex systems, change occurs naturally and automatically in order to increase efficiency and effectiveness. This change, self-organization, is accomplished by the elements that make up the system responding to feedback from the system's environment regarding efficiency and effectiveness.

Linear change is where a sequence of events affects each event in the order in which they appear. In contrast, non-linearity means that elements changed by previous elements can also affect the elements that preceded the immediately preceding elements.

In system development, with strong knowledge of the early stages, it can be fairly easy to predict a range of possibilities for the next stage. But farther down the development sequence, it is far more difficult to predict based only on knowledge of the first stage. Even when knowledge of the system is extensive, and even though there is logical development from stage to stage, predicting developments farther down the sequence can be increasingly difficult. This uncertainty of predictability is called "chaos."

The unpredictability that is inherent in the natural evolution of complex systems can yield results that are totally unpredictable based on knowledge of the original conditions. Such unpredictable results are called emergent properties. Emergent properties are still a logical result, just not a predictable result.

In such complex adaptive systems, networks of interacting individuals create an operating history that weaves together a story. Once the narrative coalesces, knowledge of it by the components of the system can influence individual behavior. Thus, the recall of group memories by group members can be viewed as an evolving dynamical system with group properties that emerge from the interactions among the participants, and between the participants and the group.

The fractal function, $z_{n+1}=z_n^2+C$, represents the group recall of a shared experience among three participants, E, F and G. C represents a catalyst that precipitates the interaction and consequent memory recall. The first iteration ($Z_1$=E) comes from the first participant E's contribution to the group recall, which consists entirely of explicit memory, those memories recalled directly by the participant.

For the second iteration of the equation ($Z_2=Z_1*F+C$), the inputs are 1) the second participant F's contribution, also consisting of explicit memory; and 2) the output from the previous function ($Z_1$). The output this time ($Z_2$) is a compound of the explicit memory contributed by each individual, including that portion of each participant's explicit memory that intersects with others in the group (those group memories they share).

For the third iteration, and every one thereafter, the participant (in this case, G) again contributes explicit memory, and the output ($Z_3=Z_2*G+C$) is the iterated aggregation of all previously contributed explicit memory.

The fractal function continues to iterate for as many participants as required and allows for an unlimited number of participants/iterations.

Referring now to the drawings in detail, wherein like reference characters refer to like elements, there is shown in FIG. 1 a plan diagram of group members' memories A, B, C, E, F, and G (in no particular sequence) sharing information separately. FIG. 1 may be considered to be a Venn diagram containing a set of elements representing the explicit memory provided by each group member. Items A, B, C, E, F, and G represent the memories of the respective group members. Each member's separate sharing of their respective memories with the group is termed nominal group recall.

Figure 2:
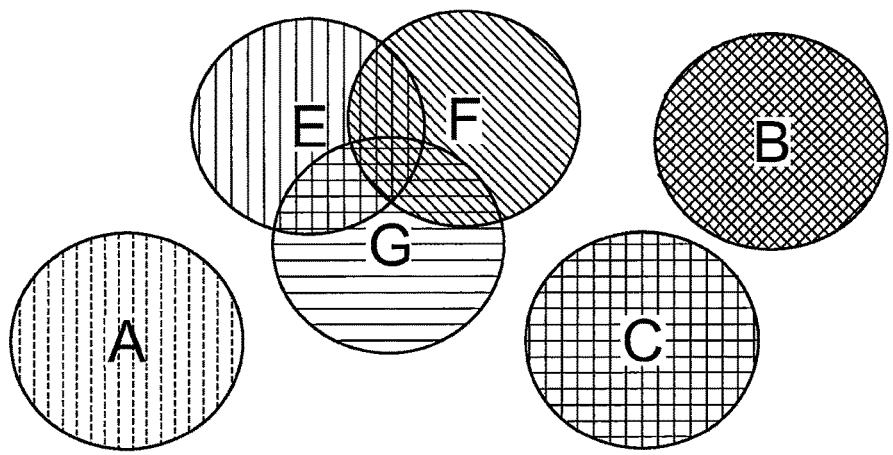
FIG. 2 is a plan diagram of group members' memories selectively including information among selected group members, according to an embodiment of the present invention.
Figure 3:
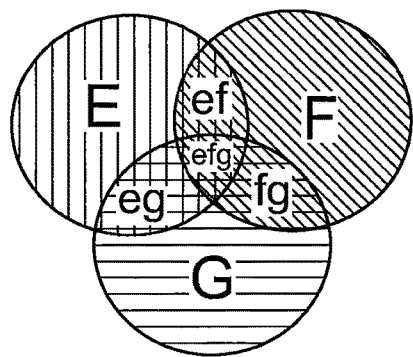
FIG. 3 is a plan diagram of selected group members collaboratively sharing information, according to an embodiment of the present invention.

Selective inclusion is shown in FIG. 2, wherein, for example, group members E, F, and G selectively include memories while not necessarily including memories from, for example, group members A, B, and C. The selected group members E, F, and G are shown in FIG. 3 collaboratively sharing information, such as memories. Collaborative memory exists within the intersection of memories shared among the selected group members E, F, and G. The Venn diagram in FIG. 3 represents the collaborative memory of selectively included group members E, F, and G according to an embodiment of the present invention. The union set of all memories provided by selectively included group members E, F, and G, contains shared memories, such as the intersection set of explicit memories from selectively included group members E, F, and G.

In the situation shown in FIG. 3, intersectional area ef may represent intersecting or shared memories shared between members E and F. Likewise, intersectional area eg may represent intersecting or shared memories shared between members E and G. Regarding members F and G, intersectional area fg may represent intersecting or share memories shared between members F and G. Intersectional area efg may represent intersecting or shared memories shared among members E, F, and G.

The information or other type of content (such as memories) provided by each member may be enhanced by the collaborative output produced by the methods of the present invention. Group members may discover new information about a shared experience for which one or more selected members may have been unaware, remembered differently, experienced from another perspective, or otherwise have non-identical information.

Figure 4:
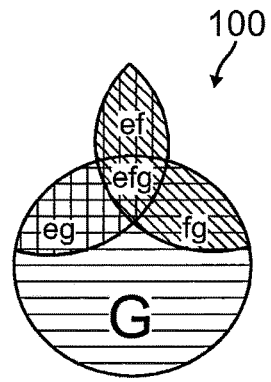
FIG. 4 is a plan diagram of an isolated portion of FIG. 3, according to an embodiment of the present invention.

Enhanced memory input may be seen in FIG. 4, which shows an isolated portion of FIG. 3, namely the information 100 available to member G, comprising intersectional information shared with member E (eg), intersectional information shared with member f (fg), intersectional information shared with members E and F (efg) plus intersectional information not originally possessed by G, but shared between members E and F (ef). The information quality available to member G is enhanced by the collaboration between members E and F. In one aspect, this could result in enhancement of member G's memory of an experience shared among members E, F, and G. Conceptually, the area of the circle representing member G's memory is enlarged by the additional portion ef added to the sum or memory originally shown for member G in FIG. 1 before the collaboration and enhancement of information.

Continuing with FIG. 4, each group member's memory now includes the collaborative memory (eg, fg, and efg) described in FIG. 3 as well as a latent memory (ef) elicited through the process of collaborative recall. The latent memory ef includes information shared by others (such as E and F) in the recall process about which the present member (G) was not previously aware.

Figure 5:
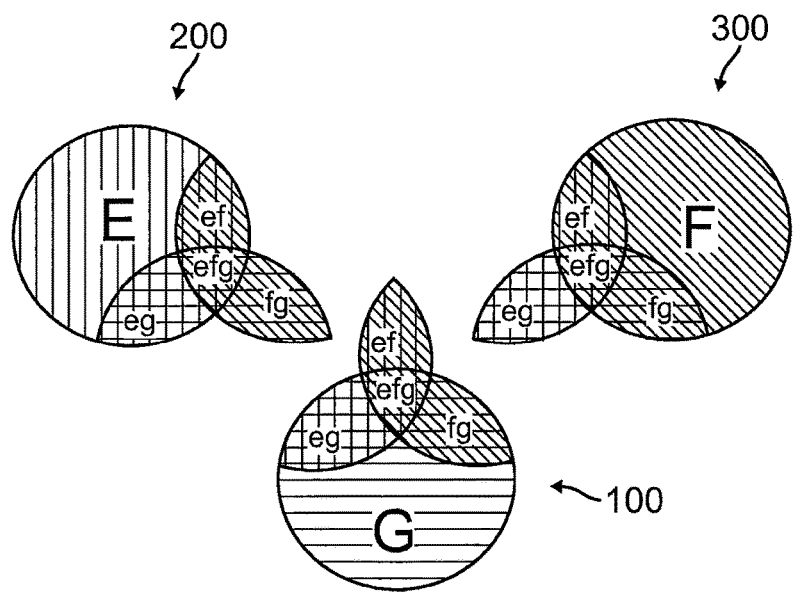
FIG. 5 is a plan diagram of group members from FIG. 3, with retained enhanced memories, according to an embodiment of the present invention.

As shown in FIG. 5 group members E and F may also retain enhanced memories, such as described above regarding member G in FIG. 4. The information 200 available to member E may be enhanced for producing output for the benefit of member E, while the information 300 available to member F may be enhanced for producing output for the benefit of member F. As demonstrated in the description and drawings referenced above, nominal group recall from FIG. 1 can proceed to selective inclusion in FIG. 2, collaboration in FIG. 3 to elicit latent memory, and producing an enhanced memory.

It should be understood that the above-mentioned group members A, B, C, although not described expressly as sharing memories with members E, F, and G, the above methods may occur among members A, B, C, or other members in parallel with the described interaction involving members E, F, and G, whether simultaneously, subsequently, prior to, or in any feasible sequence. Essentially, it is to be understood that the above examples are not limiting, especially as to the extent of interaction among group members or members of various sub-groups.

The ultimate output is a combination of all contributed explicit memory plus an emergent memory called latent memory.

Latent memory is not explicit memory, but is an emergent function of group recall. It comes into being only after participants share their explicit memories. As participants find new information about the shared experience and others provide information, about which individual participants may not recall or about which the individual participants were not previously aware. Represented graphically, latent memory lies at the intersection of two or more participant's explicit memory.

The significance of latent memory to the task of preserving memories comes from the capacity to alter how explicit memory is both perceived, and later, recalled. To preserve the most complete and accurate recollection of a shared event, the emergence of latent memory must be carefully managed. If explicit memories are combined too soon in the preservation process, then the development of latent memory may alter participants' recollection. Furthermore, because group recall has non-linear properties, the emergence of latent memory has the potential to permanently change more than one group member's recollection; an outcome potentially deleterious to an accuracy goal.

As group recall takes place, a collaborative memory $Z_{n+1}$, is constructed iteratively as each participant contributes explicit shared memory and a latent shared memory emerges. Using this iterative formula, we can demonstrate the synergistic nature of group recall by comparing the collaborative output to the collective sum of the participants' contributions. Mathematically, as long as catalyst C is positive, $a^2+2a\ bi+b^2+C$ will be greater than $a^2$. The corollary is, if catalyst C is sufficiently negative—in other words, there is sufficient noise or interference in the process—then $a^2+2a\ bi+b^2+C$ could be less than $a^2$. In other words, if the process that catalyzes the iterative memory recall is not performed properly (a negative C value), the output could be deteriorated. Conversely, if that process is performed properly (a positive C value), it will produce synergy and symbiosis (i.e., a better memory).

Figure 6:
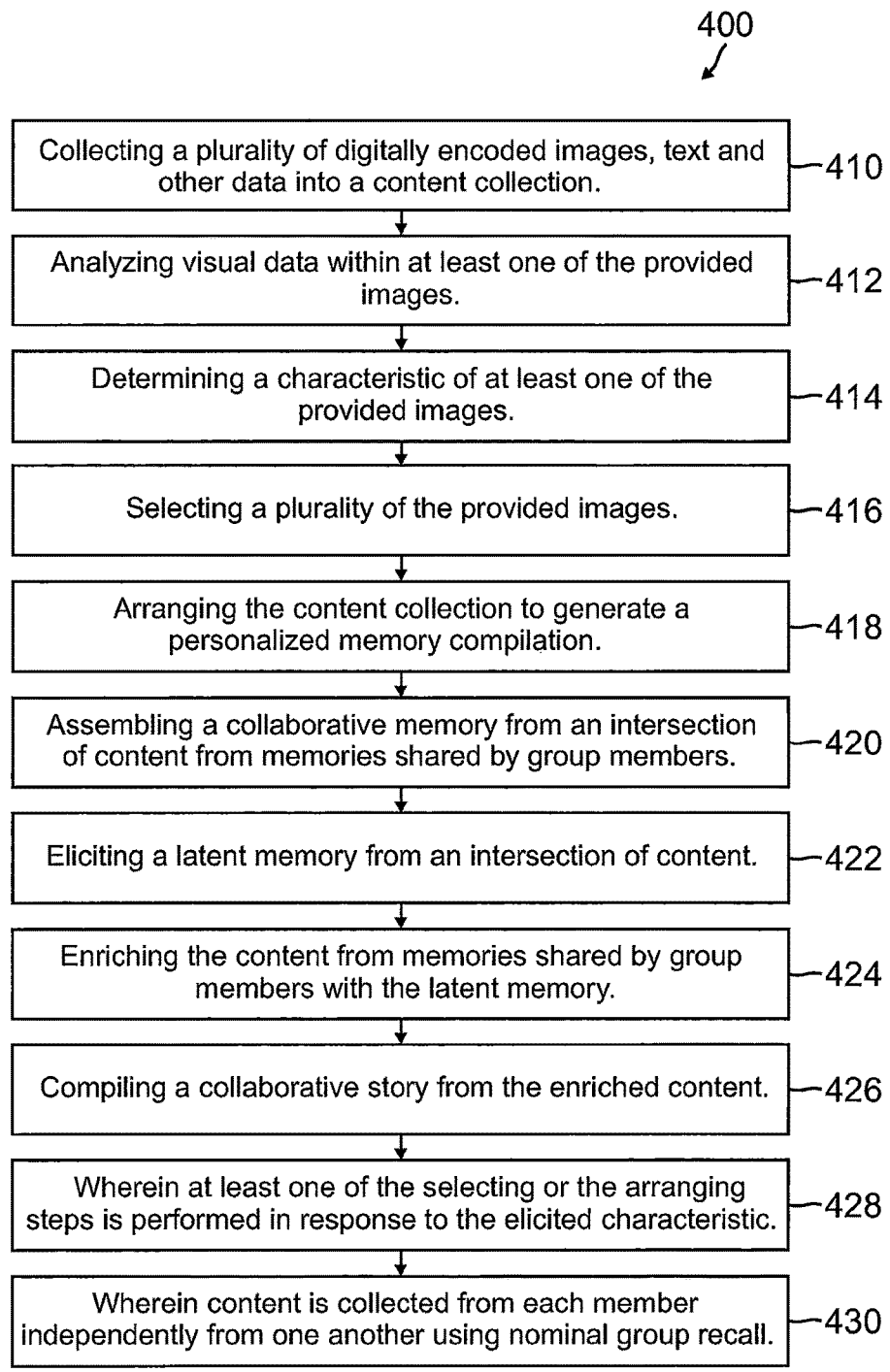
FIG. 6 is a flowchart of a method, according to another embodiment of the present invention.

Referring to FIG. 6, a method 400 of the present invention may include a Step 410 of collecting a plurality of digitally encoded images, text and other data into a content collection. Step 412 may comprise analyzing visual data within at least one of the provided images. Another step, Step 414 may include determining a characteristic of at least one of the provided images. A Step 416 may involve selecting a plurality of the provided images. Arranging the content collection to generate a personalized memory compilation comprises Step 418. Step 420 may also comprise assembling a collaborative memory from an intersection of content from memories shared by group members. A Step 422 may include eliciting a latent memory from an intersection of content. Step 424 may involve enriching the content from memories shared by group members with the latent memory. Another step, Step 426 comprises compiling a collaborative story from the enriched content. Yet another Step 428 comprises additionally performing the method 400 wherein at least one of the selecting or the arranging steps is performed in response to the elicited characteristic. Step 430 comprises performing the method 400 wherein content is collected from each member independently from one another using nominal group recall.

Figure 7:
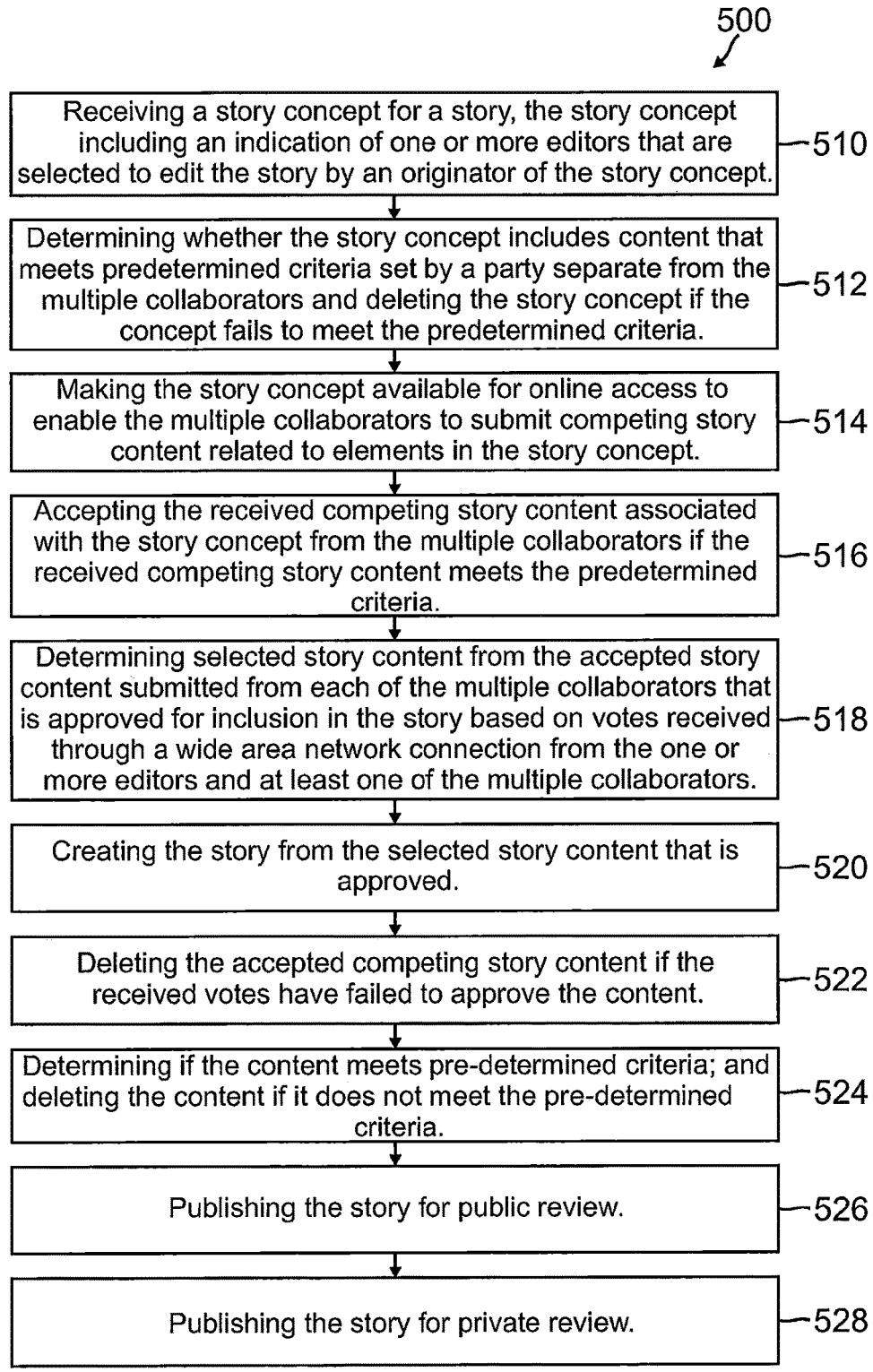
FIG. 7 is a flowchart of another method, according to another embodiment of the present invention.

Another method 500 is shown in the flowchart of FIG. 7. Step 510 comprises receiving a story concept for a story, the story concept including an indication of one or more editors that are selected to edit the story by an originator of the story concept. Another Step 512 may comprise determining whether the story concept includes content that meets predetermined criteria set by a party separate from the multiple collaborators and deleting the story concept if the concept fails to meet the predetermined criteria. Yet another Step 514 may include making the story concept available for online access to enable the multiple collaborators to submit competing story content related to elements in the story concept. An additional Step 516 may involve accepting the received competing story content associated with the story concept from the multiple collaborators if the received competing story content meets the predetermined criteria. A Step 518 may comprise determining selected story content from the accepted story content submitted from each of the multiple collaborators that is approved for inclusion in the story based on votes received through a wide area network connection from the one or more editors and at least one of the multiple collaborators. A Step 520 may include creating the story from the selected story content that is approved. Step 522 may comprise deleting the accepted competing story content if the received votes have failed to approve the content. Another step, Step 524 may include determining if the content meets pre-determined criteria; and deleting the content if it does not meet the pre-determined criteria. The method 500 optionally may include a Step 526 of publishing the story for public review and/or a Step 528 of publishing the story for private review.

Figure 8:
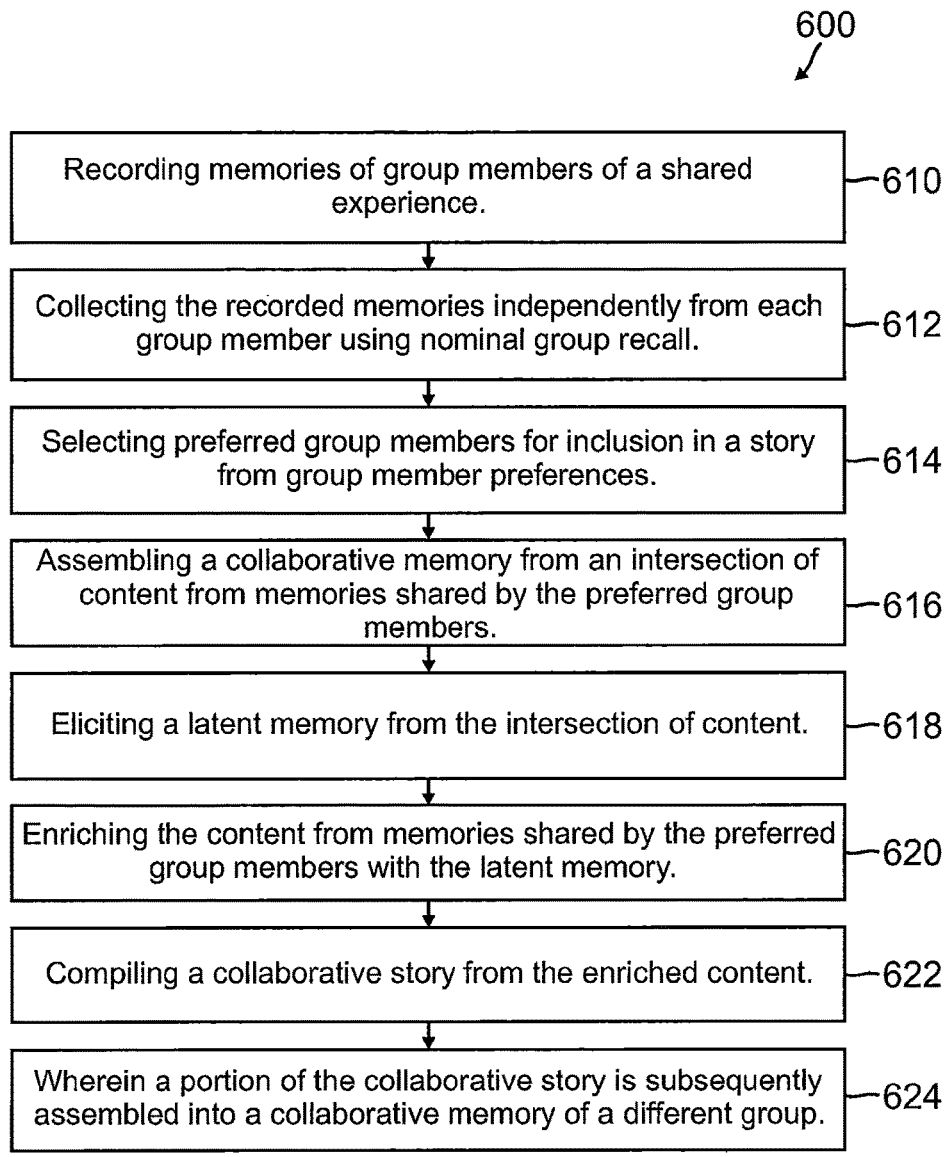
FIG. 8 is a flowchart of yet another method, according to another embodiment of the present invention.

In FIG. 8, another method 600 according to the present invention is displayed. A Step 610 may comprise recording memories of group members of a shared experience. Another Step 612 may involve collecting the recorded memories independently from each group member using nominal group recall. Yet another step, Step 614 may include selecting preferred group members for inclusion in a story from group member preferences. A Step 616 may comprise assembling a collaborative memory from an intersection of content from memories shared by the preferred group members. Another Step 618 may comprise eliciting a latent memory from the intersection of content. Yet another Step 620 may comprise enriching the content from memories shared by the preferred group members with the latent memory. Compiling a collaborative story from the enriched content may be practiced as a Step 622. The method 600 optionally comprises a Step 624 wherein a portion of the collaborative story is subsequently assembled into a collaborative memory of a different group.

One embodiment of the present invention may comprise a digitally composed version of a collection of group member profiles married with other group and personalized content that creates an individualized compilation that may be printed as a keepsake for a special occasion the group may be celebrating. The invention may feature the collecting of data and information specific and only intended for that participant. e.g., a letter from family or friends, a personal thank-you note from a participant, unique comments and photos sent by acquaintances, friends, or family.

An online application enables a first user to navigate to a web site, upload digital images, answer a series of variable questions, and combines those images with text or other related content in a stylized template to create a user-generated profile, which may be made available to members of the group for inclusion in a personalized compilation if selected by a second user. A memory compilation (such as a group memory book) may be a collection of images and text that are brought together by a stylized template that may be customized by the end user. A given story, profile, or combination of profiles may be made available on a web page at a given location (such as at a URL) that may be shared with other users, published to other web sites or web logs, or maintained exclusively for the user. The invention also provides for multiple end users to collaborate to create a "shared" story.

The present invention may contain a large portion of personalized and customized information unique to its owner. There may be portions of the compilation that are the same (e.g. group member profiles, group or organization information). One aspect of the present invention is that each group member may receive a compilation that is highly personalized.

The present invention may comprise content compiled by collecting and organizing information and data (textual, photographic and informational) submitted by group members (e.g. students, faculty, and coaches) on a website. The website may provide a social networking style user interface (UI) that provides a platform that manages group member collaboration through online interaction via a suite of web based tools designed to facilitate better communication, better interaction and better quality and volume of information and data.

Certain of said content may be provided by a pre-determined third user and assembled in a pre-programmed page template by combining a plurality of digital photos selected by the third user, each characterized by a portrait or landscape format and automatically rendered in the image areas of the selected page layout, within the limits of pre-programmed dimensions, based upon the constraints of a portrait or landscape format. The third user may provide written responses to multiple, pre-programmed, group-specific questions.

The method may be practiced wherein a first user selects from a pre-programmed list of other potential users, the electronic content of at least one second user's profile created according to any one or more preceding claims, for inclusion in the compilation.

The method may further comprise composing images, text and other content on a plurality of pages responsive to the arranging, printing and binding the pages together. The method may also continue with determining at least one characteristic of at least one of the images or text and arranging responsive to the at least one characteristic, optionally arranging responsive to the content of the images or text. Other options for the method include providing the images in a first order and arranging the images into a second order different from the first order; changing the size of an image; grouping the selected images into a plurality of groups, and wherein arranging the images comprises arranging the images responsive to the grouping; and/or arranging irrespective of an order of acquisition of the images.

In compiling memory compilations or other collaborations, users may choose to group together only certain portions of the data selected by the group. For example, if the group selects a total of eleven sections for a planned memory compilation, a user may elect to obtain only one or more sections of the eleven sections selected by the group. Also, a user may select sections not selected by the group.

It should be understood, of course, that the foregoing relates to exemplary embodiments of the invention and that modifications may be made without departing from the spirit and scope of the invention as set forth in the following claims. Furthermore, a method herein described may be performed in one or more sequences other than the sequence presented expressly herein.

We claim:

1. A collection of personalized memory compilations produced by a process comprising:
   a) assembling a content collection through nominal group recall by, for each of a plurality of members of a group defined by a shared experience, independently performing a set of acts comprising:
      i) prompting that member to provide computer readable data items representing memories of that member which are relevant to the shared experience;
      ii) receiving, from that member, one or more computer readable data items representing memories of that member which are relevant to the shared experience;
      iii) storing the one or more computer readable data items received from that member in the content collection;

b) selectively including data items representing intersections of memories of different individuals in personalized memory compilations by, for each of the plurality of members of the group, performing a set of acts comprising the following acts with that member as subject member:
  i) receiving, from the subject member, memory enrichment information, wherein the memory enrichment information comprises information identifying other group members whose memories should be included in a personalized memory compilation for the subject member; and
  ii) generating the personalized memory compilation for the subject member, wherein the personalized memory compilation for the subject member comprises:
    A) the computer readable data items stored in the content collection which represent memories of the subject member which are relevant to the shared experience; and
    B) the computer readable data items stored in the content collection which represent memories of other members identified as members whose memories should be included in the personalized memory compilation for the subject member;
wherein the collection of personalized memory compilations includes a personalized memory compilation for each of the plurality of members of the group.

2. The collection of personalized memory compilations of claim 1, wherein the process by which the collection of personalized memory compilations are produced comprises, for each of the plurality of members of the group:
  i) providing that group member a list of other individuals who could potentially submit computer readable data items which should be included in that group member's personalized memory compilation; and
  ii) enabling that group member to select individuals from the list of other individuals whose computer readable data items should be included in that group member's personalized memory compilation.

3. The collection of personalized memory compilations of claim 1, wherein:
  a) the personalized memory compilation for a first group member from the plurality of members of the group comprises:
    i) information from an individual who is not a member of the group which is specific to the first group member; and
    ii) information from another group member which his' is specific to the first group member; and
  b) the information which is specific to the first group member is included only in the first group member's personalized memory compilation.

4. The collection of personalized memory compilations of claim 1, wherein the personalized memory compilation for a first member from the plurality of members of the group excludes at least one set of computer readable data items which is included in personalized memory compilations for other group members.

5. The collection of personalized memory compilations of claim 4, wherein the group comprises a second group member in addition to the plurality of members of the group for whom personalized memory compilations are generated, and wherein the set of computer readable data items which is excluded from the personalized memory compilation of the first group member comprises data items submitted by the second group member.

6. The collection of personalized memory compilations of claim 1, in the process by which the collection of personalized memory compilations are produced, for each of the plurality of members of the group, the act of prompting that member to provide computer readable data items representing memories of that member which are relevant to the shared experience comprises providing that member with variable questions which are specific to the group defined based on the shared experience.

7. The collection of personalized memory compilations of claim 1, wherein each personalized memory compilation in the collection of personalized memory compilations is a book.

8. The collection of personalized memory compilations of claim 1, wherein the collection of personalized memory compilations is adapted to elicit latent memories from the plurality of members of the group by providing the plurality of members of the group access to other group members' memories in a controlled manner after those memories are assembled into personalized memory compilations through nominal group recall and selective inclusion.

9. A manufacture comprising a plurality of personalized memory compilations for members of a group defined based on a shared experience, wherein:
  a) each of the memory compilations from the plurality of personalized memory compilations:
    i) is personalized for a different member of the group defined based on the shared experience; and
    ii) comprises a set of items representing explicit memories of the member for whom it is personalized which are relevant to the shared experience;
  b) the plurality of personalized memory compilations comprises:
    i) a first memory compilation which:
      A) is personalized for a first member of the group; and
      B) comprises the set of items representing explicit memories of a second member of the group which are relevant to the shared experience;
    ii) a second memory compilation which:
      A) is personalized for the second member of the group; and
      B) comprises the set of items representing explicit memories of a third member of the group which are relevant to the shared experience;
  c) the set of items representing explicit memories of the third member of the group which are comprised by the second memory compilation are excluded from the first memory compilation.

10. The manufacture of claim 9, wherein the plurality of personalized memory compilations comprises, for each of the members of the group defined based on the shared experience, a book for that member of the group.

11. The manufacture of claim 9, wherein:
  a) the first personalized memory compilation comprises information from an individual who is not a member of the group which is specific to the first group member; and
  b) the information which is specific to the first group member is included only in the first group member's personalized memory compilation.

12. The manufacture of claim 11, wherein the information which is specific to the first group member comprises information from another group member which is specific to the first group member.

13. The manufacture of claim 9, wherein the plurality of personalized memory compilations for members of the group defined based on the shared experience are adapted to elicit latent memories from the members of the group by providing the members of the group access to each other's memories in a controlled manner after those memories are assembled into personalized memory compilations through nominal group recall and selective inclusion.

* * * * *

UNITED STATES PATENT AND TRADEMARK OFFICE
CERTIFICATE OF CORRECTION

PATENT NO. : 10,346,512 B2
APPLICATION NO. : 15/019282
DATED : July 9, 2019
INVENTOR(S) : Robert R. Reinders and Christopher Romano Page 1 of 1

It is certified that error appears in the above-identified patent and that said Letters Patent is hereby corrected as shown below:

In the Claims

Column 11, Claim 3 a) ii), Line 49, reads "...another group member which his' is..."; which should be deleted and replaced with "...another group member which is...".

Signed and Sealed this
Third Day of September, 2019

Andrei Iancu
*Director of the United States Patent and Trademark Office*